(12) United States Patent
Lynch et al.

(10) Patent No.: US 10,400,916 B2
(45) Date of Patent: Sep. 3, 2019

(54) T-PIECE PREFORMER

(75) Inventors: Brian Lynch, Aberdeen (GB);
Dominique-Louis Delaporte, Lons (FR); Dominique Popineau, Pau (FR); Henri Marie Louis Robert Romazzotti, Arbus (FR)

(73) Assignee: TECHNIP FRANCE (FR)

( * ) Notice: Subject to any disclaimer, the term of this patent is extended or adjusted under 35 U.S.C. 154(b) by 1519 days.

(21) Appl. No.: 14/237,118

(22) PCT Filed: Jul. 24, 2012

(86) PCT No.: PCT/GB2012/051777
§ 371 (c)(1),
(2), (4) Date: Jul. 16, 2014

(87) PCT Pub. No.: WO2013/021166
PCT Pub. Date: Feb. 14, 2013

(65) Prior Publication Data
US 2014/0367959 A1 Dec. 18, 2014

(30) Foreign Application Priority Data
Aug. 11, 2011 (GB) .................................. 1113804.7

(51) Int. Cl.
*F16L 1/12* (2006.01)
*F16L 39/00* (2006.01)
(Continued)

(52) U.S. Cl.
CPC .................................. *F16L 1/16* (2013.01);
*F16L 1/19* (2013.01); *F16L 1/203* (2013.01);
*F16L 39/005* (2013.01);
(Continued)

(58) Field of Classification Search
CPC ... F16L 1/12; F16L 1/203; F16L 39/00; F16L 39/005
(Continued)

(56) References Cited

U.S. PATENT DOCUMENTS 1,930,782 A * 10/1933 Turner ...................... F28G 1/16
122/392
4,036,617 A * 7/1977 Leonard .................... F16L 7/00
138/112
(Continued)

FOREIGN PATENT DOCUMENTS

FR    2 897 919 A1    8/2007
WO    WO 98/35178    8/1998
(Continued)

OTHER PUBLICATIONS

International Search Report dated Oct. 17, 2012 issued in corresponding International patent application No. PCT/GB2012/051777.
(Continued)

*Primary Examiner* — Sunil Singh
(74) *Attorney, Agent, or Firm* — Ostrolenk Faber LLP

(57) ABSTRACT

A T-piece preformer for forming a T-piece in a pipe-in-pipe (PIP) pipeline for a marine environment, the PIP pipeline has at least inner and outer pipes having an annular space thereinbetween, and one or more cables extending along the annular space. The T-piece preformer includes at least: (a) inner and outer longitudinal collars; (b) annular walls between the inner and outer collars; (c) cable apertures through each annular wall; and (d) one or more guide points on the outer collar radially offset from the or each cable apertures, to guidance for a hole into the T-piece performer. The T-piece preformer can be assembled into a PIP pipeline, and requires a final hole during laying. The T-piece preformer has cable apertures through each annular wall, for (Continued)

allowing continuation of cables in the annular space through the PIP pipeline and T-piece preformer, and the T-piece.

9 Claims, 5 Drawing Sheets

(51) Int. Cl.
*F16L 1/16* (2006.01)
*F16L 41/02* (2006.01)
*F16L 1/19* (2006.01)
*F16L 1/20* (2006.01)

(52) U.S. Cl.
CPC ............. *F16L 41/02* (2013.01); *F16L 41/021* (2013.01); *Y10T 29/49826* (2015.01)

(58) Field of Classification Search
USPC ................................. 405/183.5; 138/112–114
See application file for complete search history.

(56) References Cited

U.S. PATENT DOCUMENTS

| | | |
|---|---|---|
| 5,141,261 A | 8/1992 | Ziu |
| 6,701,967 B2 | 3/2004 | Louis et al. |
| 2010/0034593 A1* | 2/2010 | Strong ................... F16L 1/036 405/184.5 |
| 2010/0123306 A1 | 5/2010 | Jones |
| 2013/0025875 A1* | 1/2013 | Critsinelis ............... E21B 17/01 166/372 |

FOREIGN PATENT DOCUMENTS

| | | |
|---|---|---|
| WO | WO 01/55630 A1 | 8/2001 |
| WO | WO 2011/007083 A1 | 1/2011 |

OTHER PUBLICATIONS

International Preliminary Report on Patentability and Written Opinion of the International Searching Authority dated Feb. 11, 2014 issued in corresponding International Patent Application No. PCT/GB2012/051777.

Search Report dated Nov. 16, 2011 issued in corresponding Great Britain Patent Application No. GB 1113804.7.

* cited by examiner

T-PIECE PREFORMER

CROSS REFERENCE TO RELATED APPLICATIONS

The present application is a 35 U.S.C. § 371 National Phase conversion of PCT/GB2012/051777, filed Jul. 24, 2012, claiming the benefit of United Kingdom Application no. 1113804.7, filed Aug. 11, 2011, the disclosure of which is incorporated herein by reference. The PCT International Application was published in the English language.

TECHNICAL FIELD OF THE INVENTION

The present invention relates to a T-piece preformer for use in a pipe-in-pipe pipeline with one or more cables, preferably but not exclusively for use with the reeled-lay method of laying a pipeline. The present invention also relates to such a pipeline once formed, and to methods of installing the T-piece preformer, and to providing the T-piece in the laying pipeline, as well as laying such as pipeline.

BACKGROUND OF THE INVENTION

Offshore oil and gas production is being pushed both into deeper waters, and pushed to extend further from or between operational facilities. As such, 'pipe-in-pipe' pipelines, also known as PIP pipelines, are being developed with more and more accessories. PIP pipelines are well known in the art, and generally comprise an outer pipe and at least one, usually one, concentric or co-axial inner pipe. The inner pipe is used to transport or convey fluids such as hydrocarbons, in particular oil and gas, between two or more static and/or moveable locations, and can also be termed the flowline. This includes conveying fluids between vessels, or locations at or near a seabed such as an oil head, in particular a remote oil head, to an underwater facility and/or to a riser towards sea level, and/or directly to an onshore facility.

The outer pipes forming the pipeline generally provide protection, as well as an annular space between the inner and outer pipes for various purposes. These can include thermal insulation, as well as a number of accessories having a specific function. For example, there can be transverse bulkheads for transferring mechanical loads between the outer pipe and the inner pipes. Buckle arrestors prevent the provocation of radial buckles, such as that shown in U.S. Pat. No. 6,701,967 which describes a double-walled pipe of the reelable type. Waterstops avoid the ingress of water within a compartment defined between two waterstops.

More particularly, the annular space can also be for the provision of one or more cables extending beyond the PIP pipeline. Such cables can include fibre optic cables for the transmission of signals and other information, as well as heating cables designed to warm the inner pipe to help avoid the risk of hydrate plugging and wax formation in oil and gas pipelines and flow lines.

As is known, the resistance to flow of liquid products such as oil increases as temperature decreases, and the formation of hydrates and waxes in oil and gas pipelines can block such pipelines. Conventional methods of remediating the problem of hydrate or wax plugs can involve the use of chemical agents, blowdowns and pigging operations, as well as heating of the pipeline and the provision of thermal insulation.

Chemical agents can also be injected into the fluid being conveyed by the inner pipeline in order to enhance the recovery of the hydrocarbons, particularly over a long distance, through a relatively cold region, and/or to a surface installation. For example, methanol can be injected to avoid the formation of hydrates that would otherwise plug the pipeline.

The injection of chemical agents requires an injection port. Conventionally, this is provided by a "T-piece" in the PIP pipeline at a required location. Conventionally, a T-piece is a short section of a co-axial pipe having inner and outer pipe sections connected with a transverse section, which transverse section includes a hole or tube for the injection of the chemical agent into the inner pipeline. Such a conventional T-piece is shown in FIGS. 1a and 1b of the accompanying drawings.

Meanwhile, there are two common methods of laying underwater or marine pipelines. The 'stove piping method' involves assembling pipe stalks on a marine pipe-laying vessel, and then welding each one as the laying progresses. In the 'reeled lay method', the pipeline is assembled onshore from a number of stalks or sections, spooled onto a large reel, sometimes also termed a storage reel or drum, and then unwound from the reel as the pipe is being laid. Once offshore, the pipeline is unwound from the reel and is directly available for laying through a lay ramp, with no section-welding being required during the offshore operation.

The reeled lay method is faster than the stove piping method, such that it is preferred where possible. Thus, for the introduction of a conventional T-piece in a reeled pipeline during the reeled lay method, the reeled pipeline is unwound from the reel and cut on the lay ramp. Lay ramps are well known in the art, and generally include one or more clamps able to hold the pipeline immediately prior to its entry into the marine environment.

As depicted in FIGS. 1a and 1b herewith, the un-reeled pipeline 2 is cut, to allow the introduction of a conventional T-piece 4. The inner pipe 6 of the T-piece 4 is then welded via welds 5 to the inner pipe 7 of the pipeline 2 first, and then two outer shells 8 are provided to create the connection and continuation of the outer pipe 10 of the conventional T-piece 4, and the outer pipe 12 of the pipeline 2. The conventional T-piece 4 provides an injection port 14 for the introduction of methanol (MeOH) or other chemical agents as discussed above. Once the welding is complete as shown in FIG. 1b herewith, the laying of the pipeline 2 can continue.

Whilst the method and operation shown in FIGS. 1a and 1b are known in the art, they are not carried out on PIP pipelines having cables extending along the annular space between the inner and outer pipes, as this would also require the cutting and hopeful reconnection of all the cables. Not only have such cables been particularly fitted during installation onshore, and may not be readily accessible again for reworking offshore, but assurance is also needed concerning the integrity of the reconnections, especially the optimal continuation of the cable functions if cut and reconnected, which may include fibre optic signal transmissions. Thus, the cutting of such cables is not recommended in the art.

Also, the nature and shape of the conventional T-piece as shown in FIGS. 1a and 1b means that it cannot be added into the pipeline as part of the assembling process onshore for two reasons. Firstly, the injection port extends beyond the outer circumference of the pipeline, which does not allow it to be properly reeled onto a storage reel. Secondly, it is not able to accommodate cables.

It is an object of the present invention to provide an improved T-piece, through the provision of a T-piece preformer, a PIP pipeline comprising said T-piece preformer and subsequently said T-piece, as well as to provide methods of installing the T-piece preformer, and of providing the T-piece in the laying pipeline, as well as laying such as pipeline.

SUMMARY OF THE INVENTION

Thus, according to one aspect of the present invention, there is provided a T-piece preformer for forming a T-piece in a pipe-in-pipe (PIP) pipeline for laying in a marine environment, the PIP pipeline comprising at least inner and outer pipes having an annular space thereinbetween, and one or more cables extending along the annular space, the T-piece preformer comprising at least:
(a) inner and outer longitudinal collars corresponding in circumference to the circumferences of the inner and outer pipes of the PIP pipeline;
(b) one or more annular walls extending between the inner and outer collars;
(c) one or more cable apertures through each annular wall; and
(d) one or more guide points on the outer collar radially offset from the or each cable apertures, and able to provide guidance for a hole into the T-piece preformer from outside the outer collar to within the inner collar.

The T-piece preformer can be assembled into a PIP pipeline onshore, and only requires the provision of a final hole during laying. Moreover, the T-piece preformer has one or more cable apertures through the or each annular wall, particularly adapted for allowing the continuation of cables in the annular space or spaces in the PIP Pipeline, and through the T-piece preformer, and so through the subsequently formed T-piece ready for use.

The PIP pipeline comprises at least inner and outer concentric or coaxial pipes, having one or more annular spaces thereinbetween. Generally, the PIP pipeline is formed of a number of pipeline stalks or sections, commonly but not limited to each having inner and outer pipeline sections of the same or similar length. The nature and dimensions and other parameters of the inner and outer pipeline sections can differ, generally due to the differing purposes, as is well known in the art.

PIP pipelines, formed from multiple sections, can be relatively short, such as under 1 km long, or be up to several kilometres or more long.

The number, nature, size and other parameters of cables able to extend along the annular space between the inner and outer pipes of a PIP pipeline are also well known in the art, and are not discussed in further detail herewith. Heating cables and fibre optic tables are two examples of such cables. The specific use and nature of such cables is usually such that it is preferred not to have to cut such cables if at all possible during the laying operation. That is, it is significantly easier and more cost effective if such cables can be provided into the PIP pipelines onshore in a single and continuous operation, after which such cables are not affected during the laying operation. Examples include multiple heating cables having specific orientations or layout around and along the inner pipe.

The T-piece preformer of the present invention has inner and outer longitudinal collars corresponding in circumference to the circumferences of the inner and outer pipes of the PIP pipelines. The shape, length and other dimensions or parameters of the inner and outer longitudinal collars may be the same or may be different, such as the outer collar being of a shorter length than the inner collar.

The one or more annular walls in the T-piece preformer have one or more cable apertures therethrough. The cable apertures may have any size, nature and design, and may be specifically adapted for the passage of particular cables, or may be generally in the form of slots or holes, made by an easy fabrication process for the general acceptance of cables.

The T-piece preformer of the present invention may include any number of cable apertures, such as, but not limited to, 3-8 cable apertures. Multiple cable apertures may be evenly distributed around the annular wall to assist any form of cable installation technique or method.

The or each guide point of the T-piece preformer of the present invention is radially offset from the or each cable aperture, such that the later provision of a hole to form the final part of the T-piece will not pass through a cable aperture, and will therefore not pass through any cable extending through the cable aperture(s).

The or each guide point is for providing guidance for a hole into the T-piece preformer from outside the outer collar to within the inner collar. As the outer and inner collars will form part of the overall extension of the PIP pipeline with its inner and outer pipes, the hole will provide a fluid passageway from outside the outer pipe of the PIP pipeline to within the bore of the inner pipeline, for the injection of one or more chemical agents or other fluids into the inner pipeline and into the fluid being conveyed thereby. After or during forming the hole, the area around the guide point may be formed, generally machined to provide a suitable fluid entry port.

Preferably, the T-piece preformer of the present invention comprises 3-8 cable apertures evenly distributed around the annular wall, and a number of offset guide points radially distributed around the outer pipe, for the selection of the most suitable guide point or points when the pipeline is ready for the creation of the final hole during laying. The guide points may partly or completely extend around the circumference of the outer collar Also preferably, the or each guide point of the T-piece preformer of the present invention is recessed, sunk into, countersunk into, or otherwise flush with the outer collar. In this way, the or each guide point is within the overall circumference and dimensions of the outer pipe of the PIP pipeline, and does not affect the reelability of the PIP pipeline.

According to another embodiment of the present invention no further adaptation or reworking of the T-piece preformer is required other than the formation of the hole from outside the outer collar to within the inner collar, and optionally forming a fluid entry port, for readiness of the T-piece for fluid injection in practice.

According to another embodiment of the present invention, the T-piece preformer is forged, more preferably forged or otherwise formed as an integral piece having integral strength and no obvious mechanical joins or weaknesses.

Preferably, the T-piece preformer of the present invention is a reelable bulkhead.

According to a second aspect of the present invention, there is provided a pipe-in-pipe (PIP) pipeline for laying in a marine environment comprising a plurality of PIP sections, each section having at least inner and outer pipes having an annular space thereinbetween, the PIP pipeline having a continuum of the inner and outer pipes of the PIP sections and one or more cables extending along a continuum of the annular space, and further comprising one or more T-piece preformers as defined herein.

Preferably, the PIP pipeline is reelable.

According to another embodiment of the present invention, the PIP pipeline is for laying in a marine environment using the reeled lay method.

According to another aspect of the present invention, there is provided a method of forming a pipe-in-pipe (PIP) pipeline as defined herein, comprising at least the steps of:
(a) providing a T-piece preformer between two PIP pipeline sections;
(b) securing the inner and outer collars of the T-piece preformer to the inner and outer pipes of the two PIP sections of step (a);
(c) locating one or more cables along the annular space in the PIP pipeline and the cable aperture(s) in the T-piece preformer(s).

The providing of the T-piece preformer between the two PIP pipeline sections can be carried out by any known or conventional method, generally but not limited to welding of the collars either directly or indirectly to the inner and outer pipes of the pipeline sections, optionally with the use of one or more shells or half shells thereinbetween, particularly between the outer collar and outer pipe, in a manner known in the art.

The locating of cables along the annular space in the PIP pipeline and through the cable aperture(s) can be carried out in the same or a similar manner to the locating of cables along conventional PIP pipelines.

According to another aspect of the present invention, there is provided a method of forming a T-piece in a pipe-in-pipe (PIP) pipeline as defined herein for laying in a marine environment, the method comprising at least the steps of:
(a) providing a PIP pipeline with at least one T-piece preformer as defined herein;
(b) reeling the PIP pipeline of step (a) and providing the reeled PIP pipeline onto a marine vessel for transporting to the marine environment;
(c) unreeling the PIP pipeline for laying in the marine environment;
(d) holding the portion of the unreeled PIP pipeline comprising a T-piece preformer on the marine vessel prior to its entry into the marine environment;
(e) creating a hole from the or each guide point in the T-piece preformer from outside the outer collar to within the inner collar to form the T-piece in the PIP pipeline.

The step of reeling a PIP pipeline onto a marine vessel is well known in the art, and may involve direct reeling onto a reel or storage drum on the marine vessel, or reeling the PIP pipeline onto a reel or storage drum onshore, followed by the provision of the reeled pipeline and reel onto the marine vessel. The T-piece preformer is preferably such that is does not affect the reeling of the PIP pipeline compared to trying to reel a PIP pipeline having a conventional T-piece as shown in FIG. 1*b* herewith.

The unreeling of the PIP pipeline on the marine vessel for laying in the marine environment is also well known in the art, and generally involves unwinding the PIP pipeline from the reel or storage drum and passing the unreeled pipeline through a laying apparatus.

Preferably, the holding of step (d) is carried out in a lay ramp, lay tower, etc. Lay ramps, etc. are well known in the art, and can be for J-laying or S-laying. Lay ramps, etc. usually involve one or more clamps for holding and directing the pipeline prior to its entry into the marine environment. Parts of the lay ramp, etc. may also be for straightening and tensioning the unreeled pipeline prior to its laying. Such clamps are usually therefore able to provide the holding of the relevant portion of the unreeled PIP pipeline on the marine vessel prior to its entry into the marine environment, although the invention is not limited to the use of such clamps.

As the portion of the unreeled PIP pipeline comprising a T-piece preformer is held, it is a simple operation to then create a hole from the or each guide point in the T-piece preformer from outside the outer collar to within the inner collar, to form the final form of a or the T-piece in the PIP pipeline.

According to another aspect of the present invention, there is provided a method of laying a PIP pipeline with at least one T-piece as defined herein in a marine environment comprising the steps of;
(a) providing the PIP pipeline with a T-piece as defined herein on a marine vessel; and
(b) laying the PIP pipeline of step (a) into the marine environment.

The various aspects of the present invention can be practiced alone or in combination with one or more of the other aspects, as will be appreciated by those skilled in the relevant art. The various aspects of the invention can optionally be provided in combination with one or more of the optional features of the other aspects of the invention. Also, optional features described in relation to one embodiment can typically be combined alone or together with other features in different embodiments of the invention.

Thus, by way of example only, the present invention inclusively provides a method of forming a pipe-in-pipe (PIP) pipeline and T-piece ready for laying in a marine environment, the PIP pipeline comprising at least inner and outer pipes having an annular space thereinbetween, and one or more cables extending along the annular space, and the T-piece being formed from a T-piece preformer as defined herein, comprising at least the steps of:
(a) providing the T-piece preformer between two PIP pipeline sections;
(b) securing the inner and outer collars of the T-piece preformer to the inner and outer pipes of the two PIP sections of step (a);
(c) locating one or more cables along the annular space in the PIP pipeline and the cable aperture(s) in the T-piece preformer(s).
(d) reeling the PIP pipeline of step (c) and providing the reeled PIP pipeline onto a marine vessel for transporting to the marine environment;
(e) unreeling the PIP pipeline for laying in the marine environment;
(f) holding the portion of the unreeled PIP pipeline comprising a T-piece preformer on the marine vessel prior to its entry into the marine environment; and
(g) creating a hole from the or each guide point in the T-piece preformer from outside the outer collar to within the inner collar to form the T-piece in the PIP pipeline.

BRIEF DESCRIPTION OF THE DRAWINGS

Embodiments of the present invention will now be described by way of example only and with reference to the accompanying diagrammatic drawings in which.

DESCRIPTION OF PREFERRED EMBODIMENTS

Figure 1A:
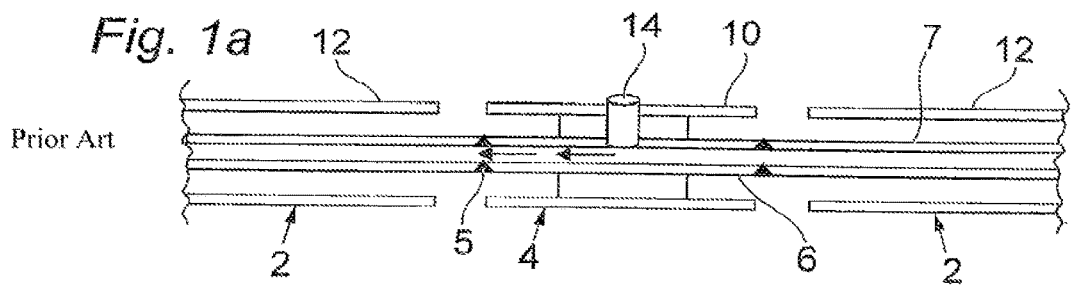
FIGS. 1*a* and 1*b* are prior art cross-sectional part-formed and fully formed PIP pipelines including a conventional T-piece.
Figure 1B:
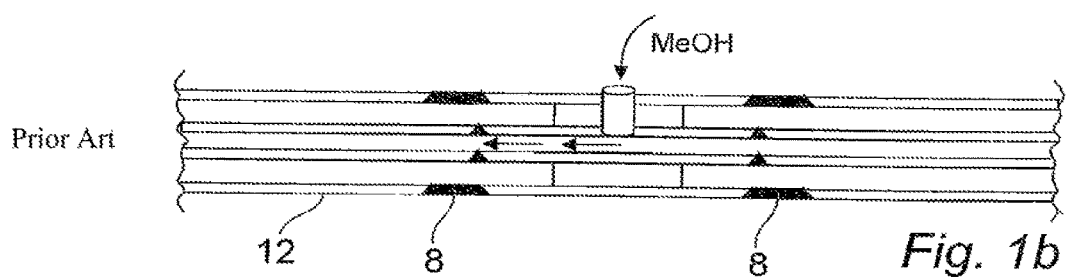

Referring to the drawings, FIGS. 1a and 1b herewith relate to the prior art method of locating a conventional T-piece 4 in an un-reeled pipeline 2 as discussed hereinbefore. The un-reeled pipeline 2 is cut at the point of laying, such as on the lay ramp, to allow the introduction and positioning of a conventional T-piece 4. The inner pipe 6 of the T-piece 4 is then welded via welds 5 to the inner pipe 7 of the pipeline 2 first, and then two outer shells 8 are provided to create the connection and continuation of the outer pipe 10 of the conventional T-piece 4, and the outer pipe 12 of the pipeline 2. The conventional T-piece 4 provides an outstanding injection port 14 for the introduction of methanol (MeOH) or other chemical agents as discussed above. Once the welding is completed as shown in FIG. 1b herewith, the laying of the pipeline 2 can continue.

As mentioned above, the method and operation shown in FIGS. 1a and 1b is not carried out on PIP pipelines having cables extending along the annular space between the inner and outer pipes, as this would also require the cutting and hopeful reconnection of all the cables. Not only have such cables been particularly fitted during installation onshore and may not be readily accessible offshore, but assurance is also required about the integrity of the continuation of the cable functions once cut and reconnected.

Also, the nature and shape of the conventional T-piece 4 means that it cannot be added into the pipeline as part of the assembling process offshore for two reasons. Firstly, the injection port 14 extends beyond the outer circumference of the pipeline 12, which does not allow it to be properly reeled onto a storage reel. Secondly, it is not able to accommodate cables therethrough.

Figure 2:
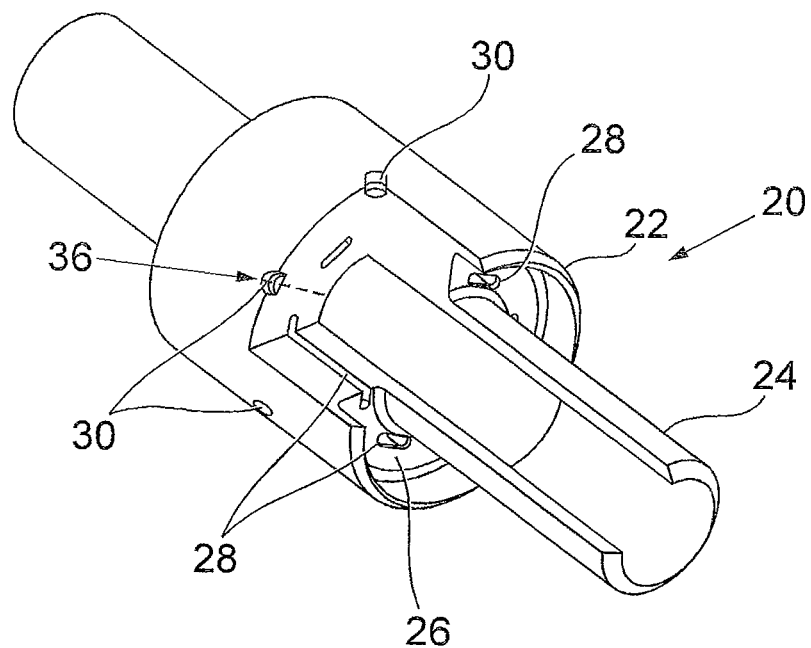
FIG. 2 is a part-cut away perspective view of a T-piece preformer according to one embodiment of the present invention.
Figure 3:
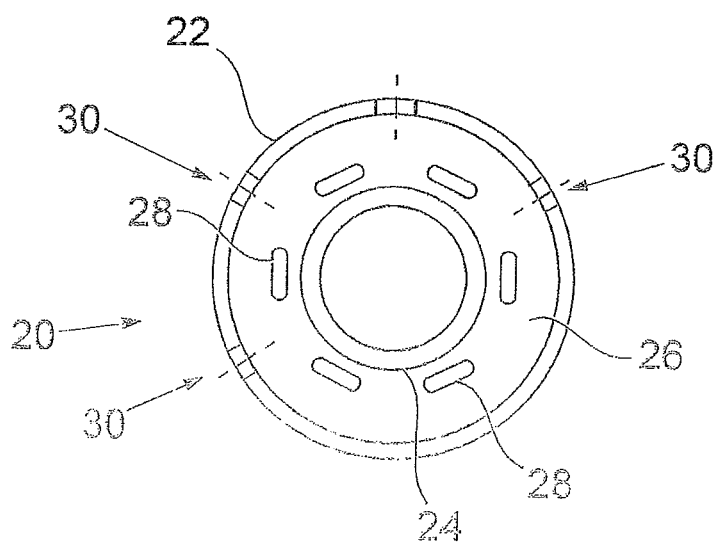
FIG. 3 is a radial cross-sectional view of a mid-point along the T-piece preformer of FIG. 2.

FIGS. 2 and 3 show a T-piece preformer 20 according to one embodiment of the present invention for forming a T-piece in a pipe-in-pipe (PIP) pipeline for laying in a marine environment.

The T-piece preformer 20 comprises an outer longitudinal collar 22 and an inner longitudinal collar 24, corresponding in circumferences to the circumferences of inner and outer pipes of a PIP pipeline or PIP pipeline sections as discussed hereinafter. Between the inner and outer collars 22, 24 extends an annular wall 26. The skilled man is aware that the inner and outer collars 22, 24, and the annular wall 26, may have any suitable relative dimensions, which dimensions are not limited to those shown in FIGS. 2 and 3. However, by way of example only, FIG. 2 shows the outer collar 22 being of a shorter length than the inner collar 24, and the annular wall 26 having a length (or depth) close to but not the same as the length of the outer collar 22.

Extending through the length or depth of the annular wall 26 are six cable apertures 28. The cable apertures 28 are in the form of longitudinal slots, able to accommodate the passage of one or more cables extending along the PIP pipeline as discussed hereinafter.

The T-piece preformer 20 also includes a number of guide points 30 radially distributed around the circumference of the outer collar 22 to mark locations where any transverse drilling required through the T-piece preformer would avoid any cable apertures 28, and therefore any cables passing through the T-piece preformer.

FIG. 2 also shows in dashed form the intended transverse or radial path 36 for a hole from one guide point 30 into the T-piece preformer 20 from outside the outer collar 22 to within the inner collar 24, and hence to within the bore of the inner pipeline of the PIP pipeline.

Figure 4:
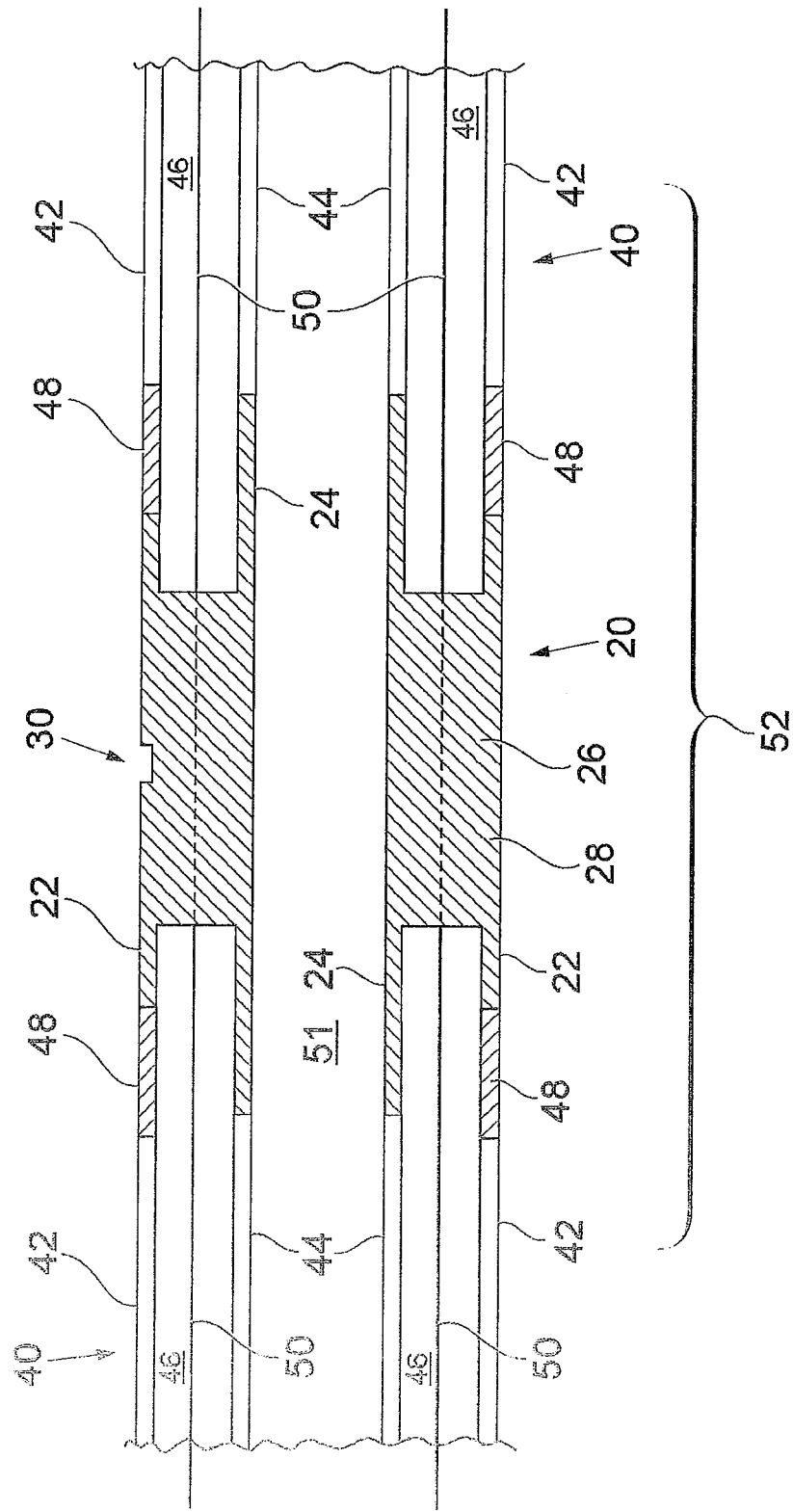
FIG. 4 is a longitudinal cross-sectional view of the T-piece preformer of FIGS. 2 and 3 between two PIP pipeline sections to form a PIP pipeline according to another embodiment of the present invention.

FIG. 4 shows the T-piece preformer 20 in a longitudinal cross-section, with the inner and outer collars 24, 22 and annular wall 26 thereinbetween. The T-piece preformer 20 is located between two PIP pipeline sections 40. Each PIP section 40 comprises an outer pipe 42 and an inner pipe 44.

In general, the conjunction of a number of such PIP sections 40 forms a PIP pipeline 52 with continuous longitudinal inner and outer pipes having an continuous annular space 46 thereinbetween.

According to one embodiment of the present invention, to form a PIP pipeline with a T-piece preformer in-line therein, the T-piece preformer 20 can be located in line with the free end of one PIP section 40. The inner collar 24 of the T-piece preformer 20 can then be welded to the inner pipe 44 of the PIP section 40 in a manner known in the art, followed by the direct or indirect connection of the outer collar 22 with the outer pipe 42. FIG. 4 shows the addition of half shells 48 between the outer collar 22 and the outer pipe 42 in a manner known in the art. Thereafter, a second PIP section 40 can be located at the other or free end of the T-piece preformer 20 and connected thereto, generally in the same manner, by welding and the use of half shells 48.

It can be seen from FIG. 4 that the circumferences of the inner and outer collars 24, 22, by corresponding with the circumferences of the inner and outer pipes 44, 42 of the PIP sections 40, create an overall PIP pipeline 52 having a continuous outer circumference along the PIP sections and T-piece preformer, and a continuous bore 51 along the inner pipeline in the same manner.

After forming of the PIP pipeline 52 as shown in FIG. 4, one or more cables 50 can now be installed in the PIP pipeline 52 along the annular spaces 46 and through the cable apertures 28 of the T-piece preformer 20. The cable apertures 28 are not shown in FIG. 4 as these are not part of the longitudinal cross-section comprising the guide port 30, which is radially offset therefrom as shown in FIG. 3. FIG. 4 shows two cables 50 in this regard.

Overall, FIG. 4 shows a pipe-in-pipe (PIP) pipeline 52 for laying in a marine environment comprising a plurality of PIP sections 40, each section having at least inner and outer pipes 44, 42 having an annular space 46 thereinbetween, the PIP pipeline 52 having a continuum of the inner and outer pipes of the PIP sections and one or more cables 50 extending along the continuum of the annular spaces 26, and further comprising one the T-piece preformer 20 of FIGS. 2 and 3.

FIG. 4 also shows a method of forming the PIP pipeline 52 having the T-piece preformer 20, which method is usually carried out most conveniently and economically onshore.

It is preferred that the T-piece preformer 20 is forged as a single integral piece, as shown in FIG. 2, whilst still allowing the overall PIP pipeline 52 as shown in FIG. 4 to be reelable, particularly for laying in a marine environment using the reeled lay method as discussed hereinafter.

Figure 5:
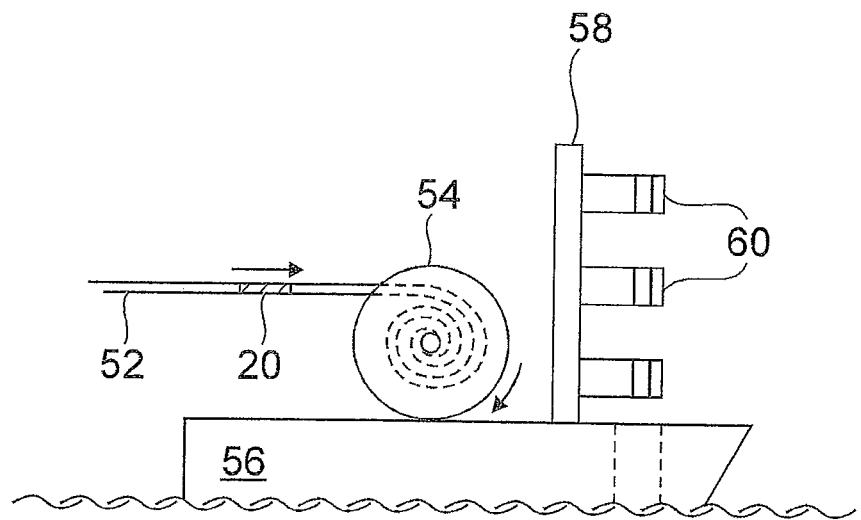
FIG. 5 is a schematic side view of the reeling of the PIP pipeline of FIG. 4 onto a marine vessel with a lay tower.

FIG. 5 shows schematically the reeling of the PIP pipeline 52 of FIG. 4 onto a storage drum or reel 54 on a marine vessel 56, generally still at an on-shore location. The marine vessel 56 includes a lay tower 58 having a number of apparatus 60 extending therefrom, which includes strengtheners, tensioners and one or more clamps as discussed hereinafter.

Following reeling of the PIP pipeline 52 as shown in FIG. 5, the reeled PIP pipeline is transported to a marine environment, usually the relevant part of the sea or ocean into which the PIP pipeline 52 is to be laid. At the relevant location, the PIP pipeline 52 is then unreeled from the reel 54 for laying in the marine environment, by its passage towards the top of the lay tower 58 and through the apparatus 60, followed by passage through a moonpool 62 in the marine vessel 56 and entry into the marine environment 62 in a manner known in the art.

At least one, generally at least two or more of the apparatus 60 include clamps or clamping means or other clamping devices, able to hold a portion of the PIP pipeline 52 static, as it passes through the lay tower 58 prior to entry into the marine environment 62. The nature and design of the clamps are known in the art. The holding of a pipeline immediately prior to its entry into the marine environment for action on the pipeline is known in the art, is not discussed in further detail herewith.

Figure 7:
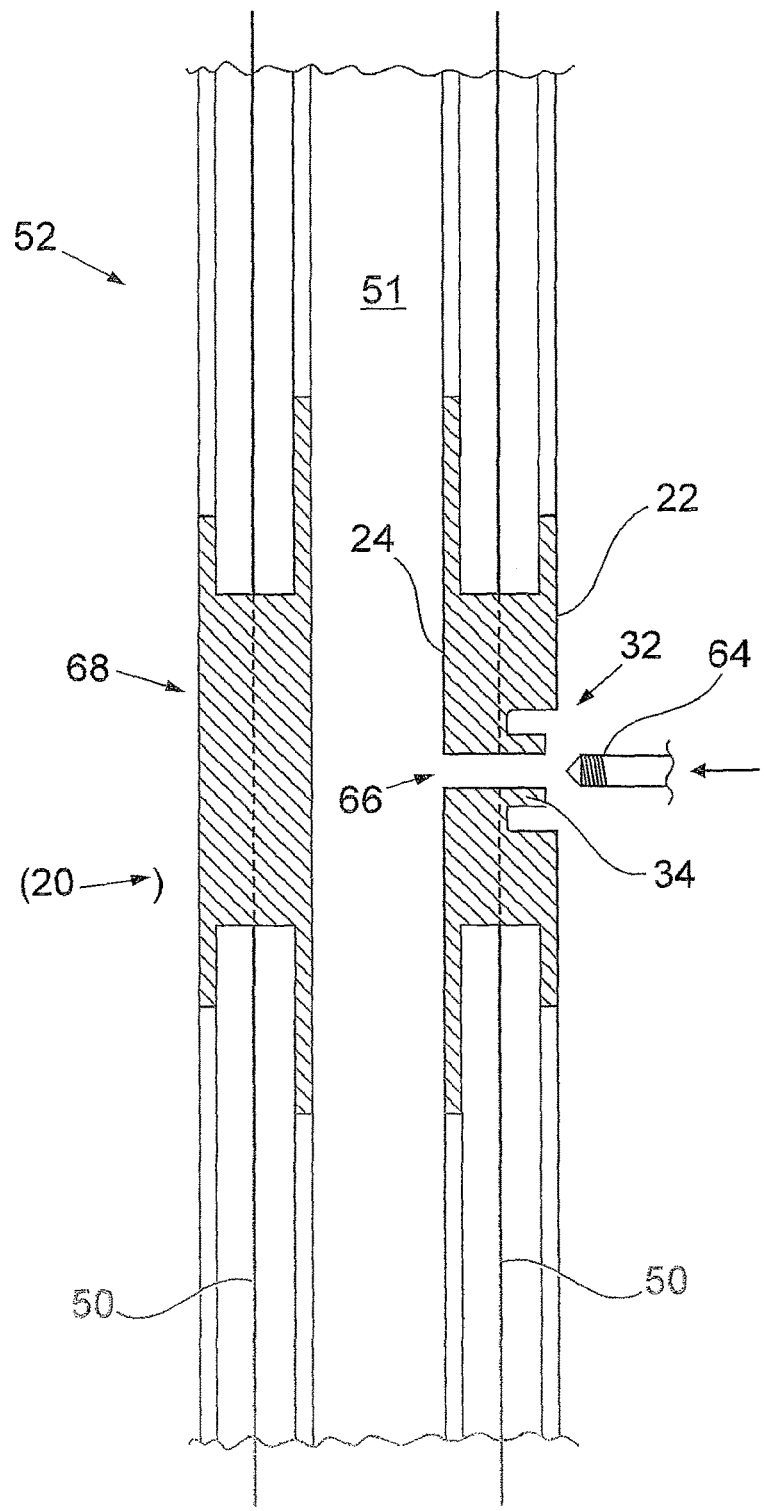
FIG. 7 is an enlarged longitudinal cross-sectional view of part of FIG. 6 showing the PIP pipeline with a formed T-piece.

FIG. 7 particularly shows the holding of the portion of the unreeled PIP pipeline 52 which comprises the T-piece preformer 20 between two apparatus 60, just prior to the entry of that portion of the PIP pipeline 52 into the marine environment 62. After holding said portion of the unreeled PIP pipeline 52, a hole 66 can be drilled (by a simple representative drill piece 64) from the most suitable or appropriate of the guide points 30 in the T-piece 20 from outside the outer collar 22 to within the inner collar 24.

After or during forming the hole 66, there can also be provided, generally machined, a recess or rebate 32 extending around the position of the guide point 30, and an upstanding fluid entry port 34, such that a hose or the like can in use be directly connected onto the fluid injection port 34 for the supply of a fluid directly through the fluid injection port 34 and hole 66, and into the bore 51 within the inner pipeline of the PIP pipeline 52.

Figure 8:
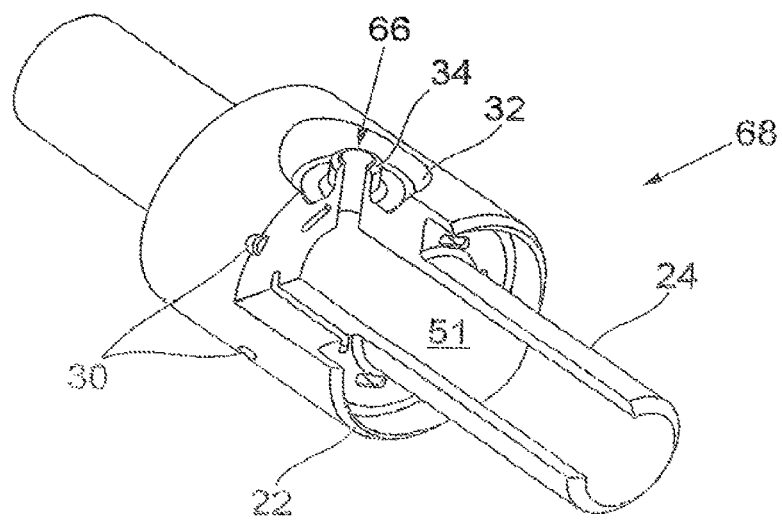
FIG. 8 is a part-cut away perspective view of the formed T-piece in FIG. 7 in isolation.

Following the creation of the hole 66, there is formed the T-piece 68 in the PIP pipeline 52 now ready for subsequent use as described above. The final form of the T-piece 68 is shown in isolation and in more detail in FIG. 8.

Figure 6:
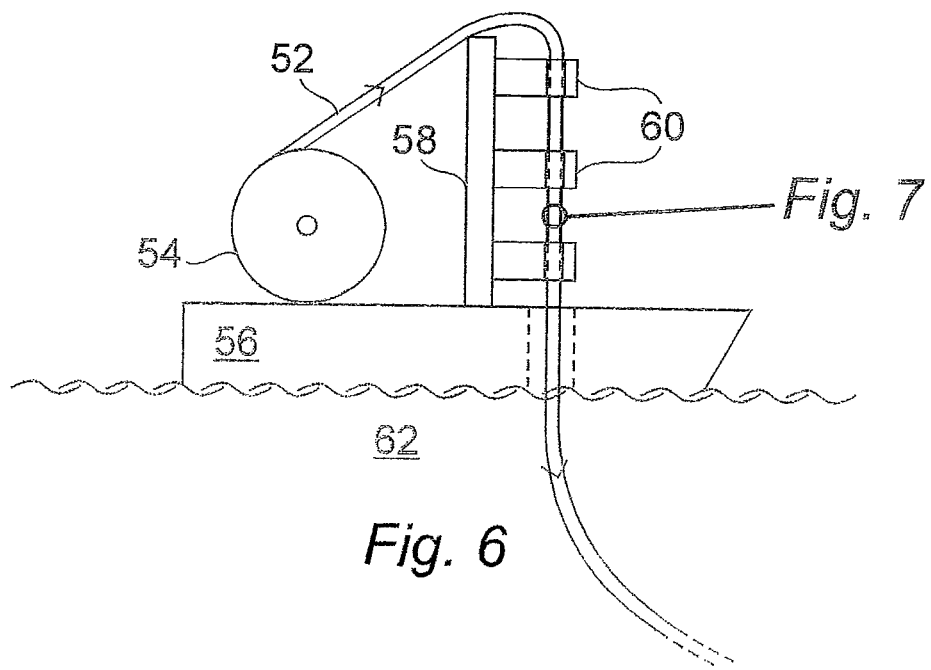
FIG. 6 is a schematic side view of the unreeling of the PIP pipeline of FIG. 5 on a marine vessel in a marine environment, and the part-laying of the PIP pipeline in the marine environment.

Following the creation of the hole 66 and the forming of the T-piece 68, the pipeline 52 can continue to be laid in the marine environment 62 as shown in FIG. 6.

The present invention provides a T-piece preformer which can be assembled into a PIP pipeline onshore, and only requires the provision of a final hole during laying. Moreover, the T-piece preformer has one or more cable apertures through the or each annular wall, particularly adapted for allowing the continuation of cables in the annular space through the PIP pipeline, and so through the subsequently formed T-piece.

In particular, such cables have not been cut after their installation into the PIP pipeline, and the forming of the hole in the T-piece preformer, to form the T-piece, can be a simple operation that can easily be carried out on the marine vessel, based on the guide point(s) provided. This is possible by the creation of a suitable T-piece preformer having the required cable apertures and a radially offset guide point, and which can be easily machined on the lay ramps.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

What is claimed is:

1. A pipe-in-pipe (PIP) pipeline for laying in a marine environment comprising a plurality of PIP sections, each PIP section having at least inner and outer pipes having an annular space thereinbetween, the PIP pipeline having a continuum of the inner and outer pipes of the PIP sections and one or more cables extending along a continuum of the annular space, and further comprising one or more T-piece preformers, each T-piece preformer comprising at least:
  (a) inner and outer longitudinal collars corresponding in circumference to the circumferences of the inner and outer pipes of the PIP pipeline;
  (b) one or more annular walls extending between the inner and outer collars;
  (c) one or more cable apertures through each annular wall; and
  (d) one or more guide points on the outer collar radially offset from the one or more cable apertures, and able to provide guidance for a hole into the T-piece preformer from outside the outer collar to within the inner collar.

2. A PIP pipeline as claimed in claim 1 having at least three and at most eight cable apertures evenly distributed around the one or more annular walls, and the one or more guide points radially distributed around the outer collar.

3. A PIP pipeline as claimed in claim 1, wherein the or each guide point is recessed into the outer collar.

4. A PIP pipeline as claimed in claim 1, wherein the T-piece preformer is forged.

5. A PIP pipeline as claimed in claim 1, being a reelable bulkhead.

6. A PIP pipeline as claimed in claim 1, wherein the pipe-in-pipe (PIP) pipeline is reelable.

7. A PIP pipeline as claimed in claim 1, wherein the PIP pipeline is configured for the laying in a marine environment with a reeled lay method.

8. A method of laying a PIP pipeline according to claim 1, the method comprising the steps of;
  (a) providing the PIP pipeline of claim 1 on a marine vessel; and
  (b) laying the PIP pipeline of step (a) into the marine environment.

9. A method of laying as claimed in claim 8, wherein the laying of step (b) comprises a reeled-lay method.

* * * * *